United States Patent Office 3,307,581
Patented Mar. 7, 1967

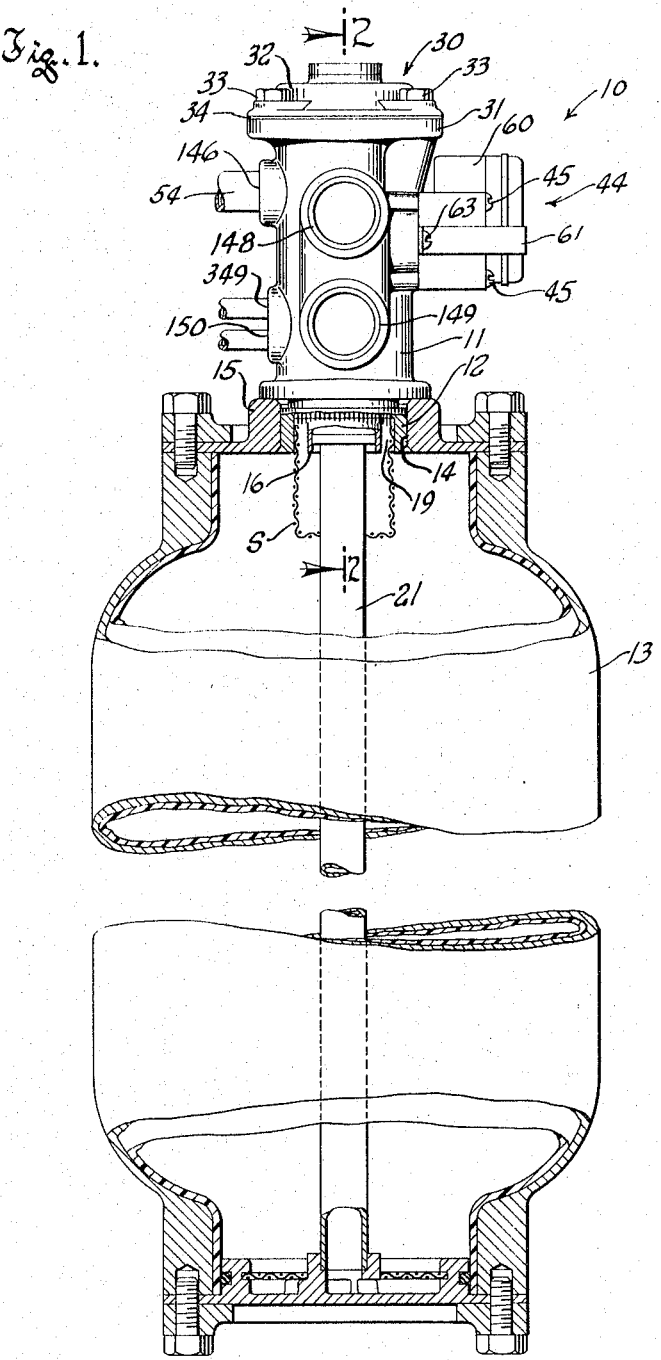

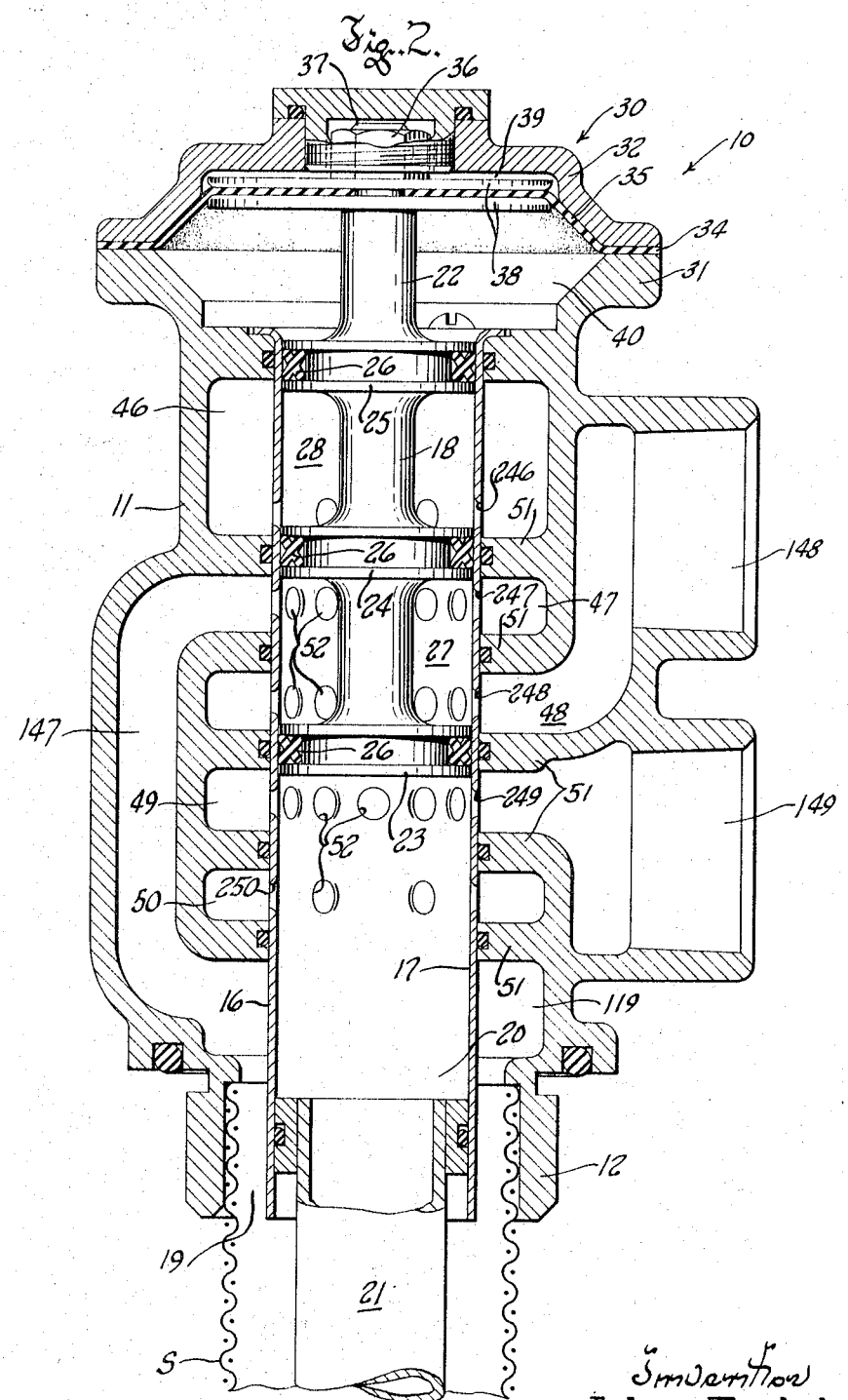

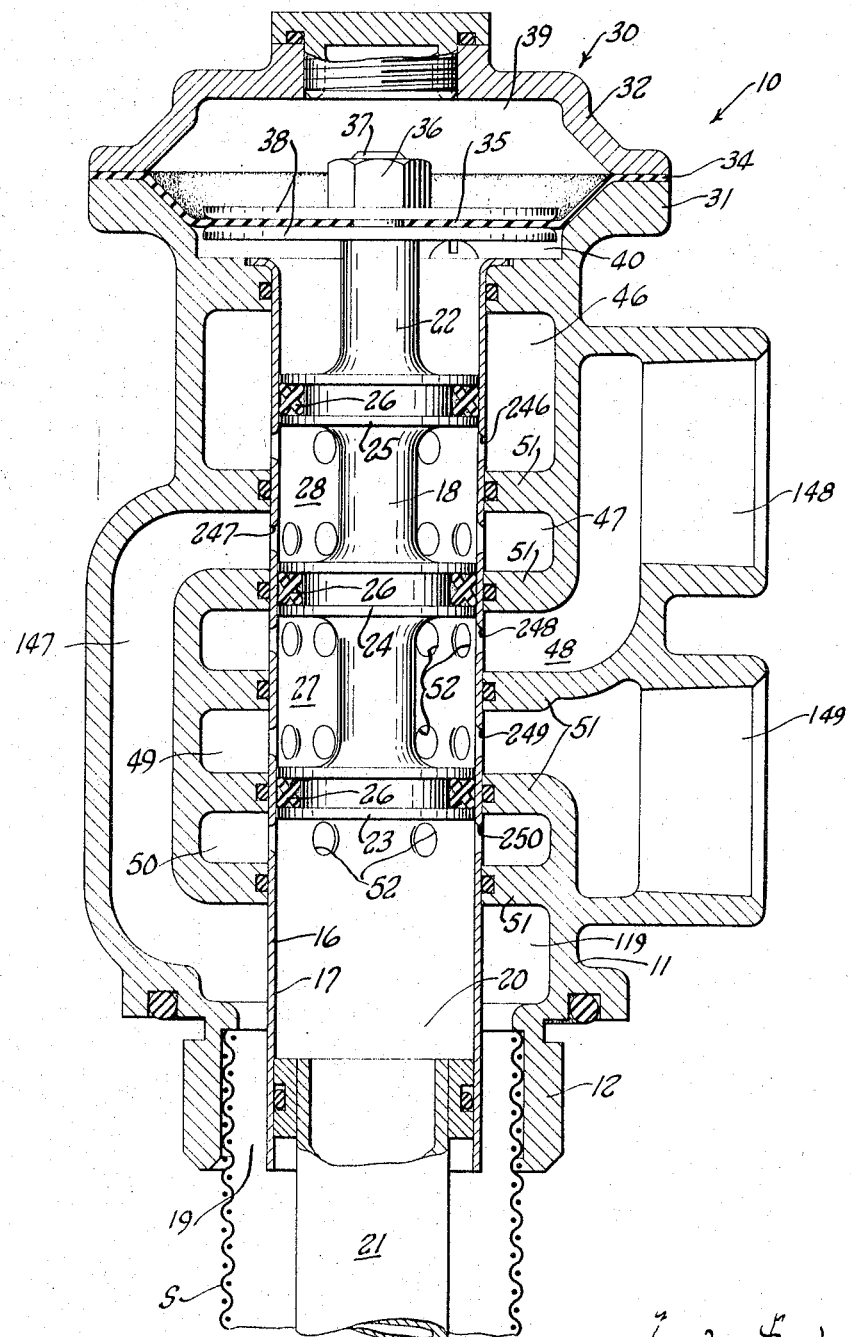

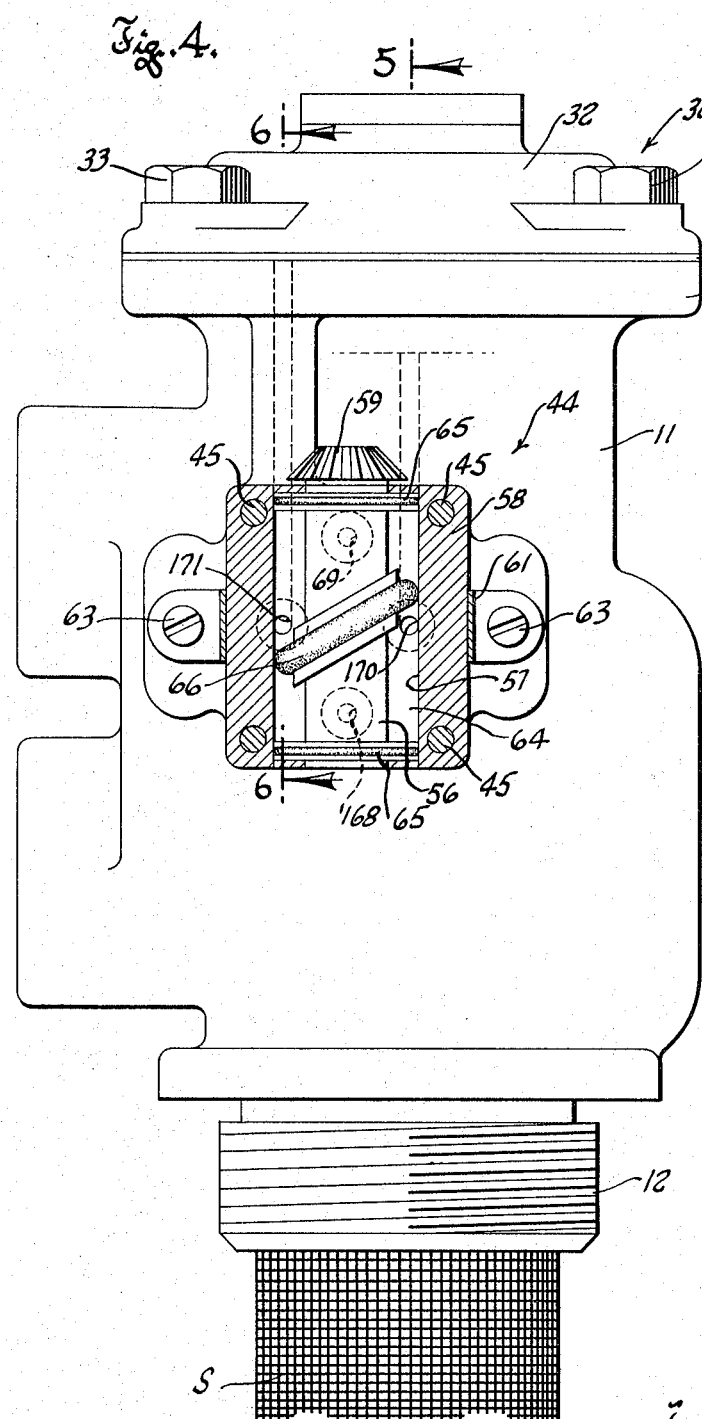

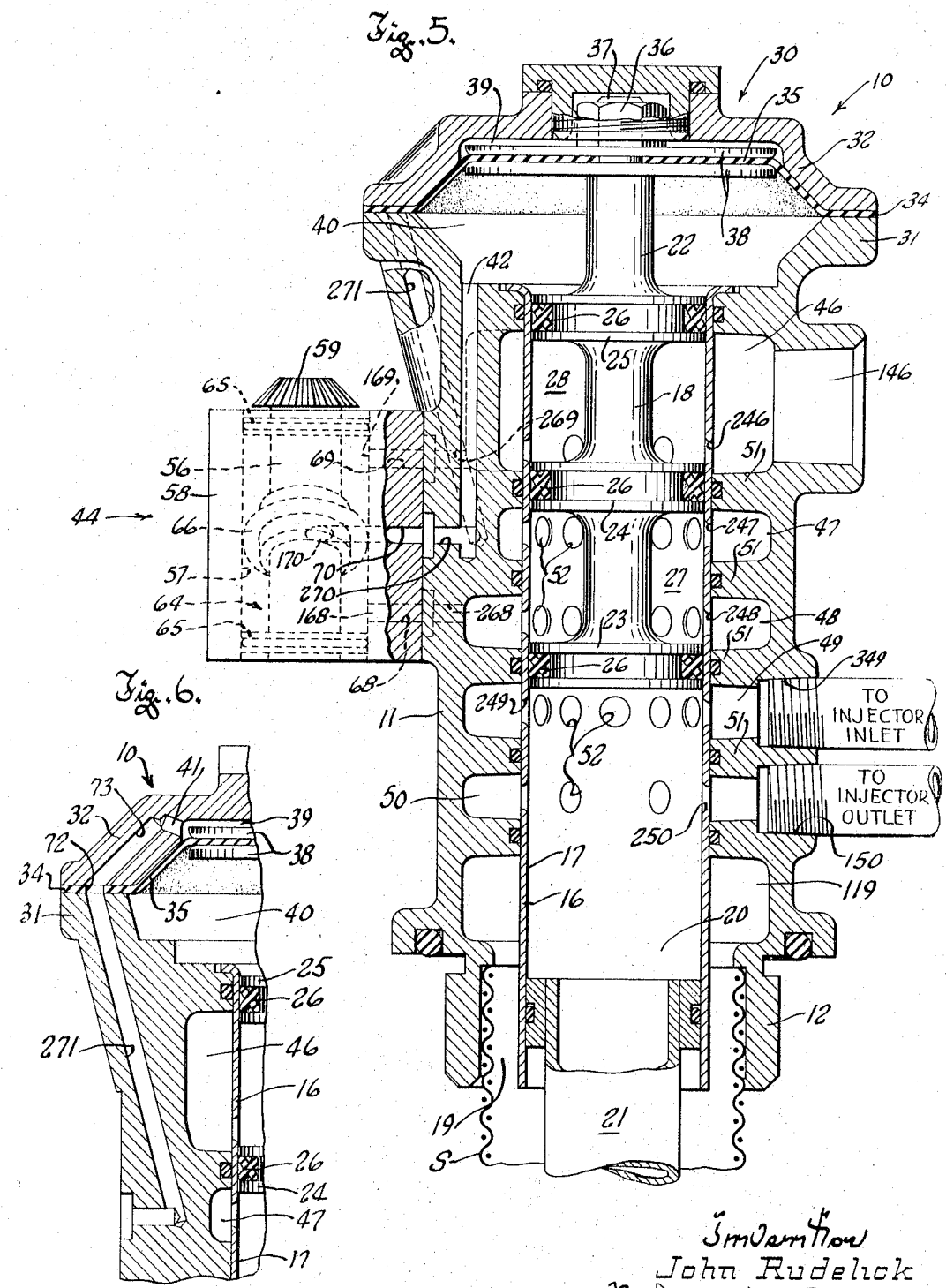

3,307,581
CONTROL VALVE FOR WATER SOFTENERS
John Rudelick, Milwaukee, Wis., assignor to Bruner Corporation, Milwaukee, Wis., a corporation of Wisconsin
Filed May 28, 1964, Ser. No. 370,823
1 Claim. (Cl. 137—625.29)

This invention relates to water softening systems, and has more particular reference to improvements in so-called two cycle automatically operated control valves for such systems.

Control valves of this type are characterized by a valve element which normally effects service flow of source water in one direction through the softener tank of the system, and which effects counterflow brining and rinsing of ion exchange material in the softener tank in a single regenerating position of the valve element.

The valve element of such a control valve is usually driven back and forth from either operating position to the other by a hydraulic actuator which is responsive to the pressure of water in the system, at the dictation of a time controlled pilot mechanism.

Heretofore, the pilot mechanism employed for this purpose comprised a solenoid valve located in and normally closing the drain line of the system. Hence, the pilot mechanism cooperated with the control valve to maintain the softener system in service operation as long as the drain line was closed by the solenoid valve, and initiated a regenerating cycle consisting of brining and rinsing in consequence of energization of the solenoid valve to open the drain line.

During regeneration, a pre-determined quantity of brine from a source thereof was caused to flow through the softener tank, followed by rinse water to wash brine from the tank and the ion exchange material therein. The brine and rinse effluent, of course, was directed through the solenoid valve to the drain line and hence to a sewer or the like.

In the past, the solenoid valves controlling the drain lines of softener systems of the type described were subject to frequent malfunctioning. Dirt and other foreign matter that had collected in the bed of ion exchange material during service operation of the system would be dislodged and carried through the solenoid valve during counterflow brining and rinsing, and often collected on the valve seat, thus fouling the valve and preventing proper closure thereof at the conclusion of the regenerating cycle. While the provision of an inlet screen in the softener tank kept some of the dirt and other water insoluble particles in the source water out of the bed of ion exchange material the foreign material trapped by the screen was merely washed back through the solenoid valve during counterflow brining and rinsing to pose the same problem of fouling of the valve.

This problem of malfunctioning of the solenoid valve was aggravated considerably in systems where ordinary rock salt was used for brine formation, and especially in those systems where the the solenoid valves comprised flexible diaphragms having small orifices which could become cloggd by dirt in the brine and rinse effluents.

With the foregoing problems in mind, it is the purpose of this invention to provide a control valve of the character described having an improved arrangement of ports and passages by which brine and rinse effluent can be routed directly to a drain line, in bypass relation to a pilot mechanism employed to govern hydraulic actuation of the valve between its service and regenerating positions, to thus assure against fouling and malfunctioning of the pilot mechanism by dirt and other foreign matter washed out of the bed of ion exchange material or contained in the brine used for regeneration thereof.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is an elevational view of a water softener tank equipped with the control valve of this invention, portions of the tank being broken away and shown in section;

FIGURE 2 is a longitudinal sectional view through the control valve per se, showing the same in its service position, and taken on the plane of the line 2—2 in FIGURE 1;

FIGURE 3 is a view similar to FIGURE 2 but showing the control valve in its regenerating position;

FIGURE 4 is a rear elevational view of the valve seen in FIGURES 2 and 3, showing the pilot valve mechanism mounted thereon with its housing broken away and in section;

FIGURE 5 is a longitudinal sectional view through the control valve, taken on the plane of the line 5—5 in FIGURE 4; and FIGURE 6 is a fragmentary detail sectional view at an enlarged scale, taken on the plane of the line 6—6 in FIGURE 4.

Referring now more particularly to the accompanying drawings, in which like reference characters represent like parts throughout the views, the numeral 10 generally designates a two cycle control valve of this invention. In the embodiment shown, the valve comprises an elongated body 11 formed with a nipple 12 at one end to adapt the body for vertical mounting on the top of an upright softener tank 13 when the nipple is screw into an internally threaded hole 14 in an adapter 15 closing the upper end of the tank. The softener tank is part of a system that includes a brine tank, not shown, and it contains a bed of ion exchange material, not shown, preferably of the synthetic resin type now commonly used in water softening systems.

A substantially thin walled tube 16 is confined in the interior of the body to provide a bore 17 that extends lengthwise of the body, and in which bore a valve element 18 is endwise slidably received. The tube opens downwardly to the exterior of the body through the nipple 12, in radially spaced concentric relation thereto, so that the space between the nipple and tube provides a first system port 19 that is in direct communication with the interior of the softener tank, at its top. The bottom portion of the tube provides a second system port 20 that can be communicated with the interior of the softener tank at its bottom by means of an elongated pipe 21 having its upper end sealingly confined in the lower end portion of the tube 16. An elongated cup shaped screen S having its open end confined in the nipple 12 and having a hole in its bottom to snugly receive the pipe 21, is provided to prevent solid foreign particles entrained in the source water from entering the tank through the port 19.

The valve element 18 comprises an elongated stem 22 having three enlarged and axially spaced lands 23, 24 and 25 thereon to slidingly fit the bore 17. So-called "Quad" rings 26 confined in circumferential grooves in the lands have sliding sealing engagement with the wall of the bore so that the lands cooperate to define a pair of axially adjacent annular valve passages 27 and 28 surrounding the valve stem.

The valve element is driven back and forth between its service position seen in FIGURES 2 and 5 and its regenerating position seen in FIGURE 3 by means of a hydraulic motor or actuator generally designated 30, which can be built into the upper end of the valve body to form a part thereof as shown. For this purpose, the upper end of the body is flared outwardly to define a flange 31 to which a saucer-like cover 32 is secured as by bolts 33. The peripheral portion 34 of a flexible diaphragm 35 is clamped between the cover and flange to act as a seal therebetween, and its medial portion is anchored to the valve stem by a nut 36 threaded onto a reduced upper extremity 37 of the stem in a conventional fashion entailing the use of a pair of stiffening washers 38 overlying the opposite sides of the diaphragm at its central area. The diaphragm divides the space inside the motor housing defined by the flange 31 and cover 32 into upper and lower diaphragm chambers 39 and 40, respectively. Motor ports 41 and 42 respectively open to the upper and lower diaphragm chambers to provide for the admittance of pressure fluid to either chamber and for the exhaust of pressure fluid from the other chamber, thus enabling the diaphragm to be flexed in either axial direction to drive the valve element from one operating position thereof to its other operating position and vice versa. As will be discussed at greater length hereinafter, the diaphragm motor 30 is governed by a pilot valve 44 secured to the exterior of the valve body at one side thereof by a number of screws 45.

The valve body is a casting which is cored to provide a number of passages, portions of which define separate annular chambers surrounding the tube 16 in axially spaced relation to one another. Reading from top to bottom, these passage portions provide a drain chamber 46 which opens to a drain port 146 at the exterior of the valve body and to the bore 17 through a port 246 in the wall of the tube 16; a first tank chamber 47 which is connected by a longitudinally extending passage 147 with the first system port 19 and which opens to the bore 17 through a port 247 in the wall of the tube; a source water inlet chamber 48 which opens to an inlet port 148 at the exterior of the body and to the bore 17 through a port 248 in the wall of the tube 16; a service chamber 49 which opens to a service port 149 at the exterior of the body directly below the inlet port and to the bore 17 through a port 249 in the wall of the tube; a brine inlet chamber 50 which opens to an injector outlet port 150 at the exterior of the body and to the bore 17 through a port 250 in the wall of the tube 16; and finally a chamber 119 which serves only to communicate the tank passage 147 with the first tank port 19. The service chamber 49 also opens to a second port 349 at the exterior of the body, which second port can be termed an injector inlet port.

Except for the chamber 119, all of the annular chambers identified above are defined by partitions 51 which embrace the tube 16 and have O rings confined in them to sealingly engage the exterior of the tube to prevent leakage of water from one chamber to another along the outside of the tube.

It will be appreciated that each of the ports in the wall of the tube 16 is provided by a series of small holes 52, arranged in a circle around the tube, so as to assure free sliding of the "Quad" rings 26 past the ports without danger of damaging the rings.

In both operating positions of the valve element 18, its top land 25 closes the upper end of the bore 17 and prevents communication between the bore and the lower diaphragm chamber 40. In its service position seen in FIGURES 2 and 5, however, the lands are so disposed with respect to the ports in the tube wall that the ports 247 and 248 open to the lower annular valve passage 27 which thus serves to communicate the first tank chamber 47 with the source water inlet chamber 48 so that source water can flow down into the tank through the first tank port 19. In this position of the valve element, the lowermost land 23 thereon lies just above the tube port 249 so that the second tank port 20 is communicated with the service outlet 149. Hence, hard water flows downwardly through the softener tank to be softened by its passage through the bed of ion exchange resin in the tank, and softened water enters the bottom of the pipe 21 and flows upwardly into the lower end portion of the bore 17 to issue through the service outlet 149.

In this service position of the valve element, it will be noted that both the injector inlet port 349 and the brine inlet port 150 are communicated with the second tank port 20 through the tube ports 249 and 250 and the lower portion of the bore 17. However, assuming that the port 349 is connected to the inlet of an injector and the brine inlet port 150 is connected to the outlet of the injector, both of said ports 349 and 150 will be at the same pressure, namely that of source water in the softener tank, so that water in the bore cannot flow to the injector through either of the tube ports 249 or 250 and the injector remains inoperative.

When the valve element is shifted to its regenerating position shown in FIGURE 3, tube ports 246 and 247 both open to the annular valve passage 28, which thus serves to communicate the first tank chamber 47 with the drain chamber 46 and to vent the top of the softener tank to a drain line 54 connected with the drain outlet 146. In its regenerating position, the tube ports 248 and 249 open to the annular valve passage 27 which thus communicates the service chamber 49 with the source water inlet chamber 48 to make fresh hard water available to the service system during regeneration. At this time, the annular valve passage 27 also communicates the source water inlet chamber 48 with the injector inlet port 349 through the service passage 49 to which the injector inlet port opens, while communicating the brine inlet chamber 50 with only the second tank port 20. Since the softener tank is now vented to drain, the pressure differential essential to injector operation now obtains as to the injector inlet and outlet ports 349 and 150, respectively, and source water can flow through the injector to cause eduction of a predetermined quantity of brine from a source thereof into the injector for delivery to the brine inlet chamber 50 and to the bottom of the softener tank through the lower portion of the bore 17 and the pipe 21.

Upflow brining is thus initiated as soon as the valve element is shifted from its service position seen in FIGURES 2 and 5 to its regenerating position shown in FIGURE 3.

It will be understood that automatically controlled systems of the type to which this invention pertains can employ a conventional brine tank and injector, and a float controlled brine valve which opens at the start of a regenerating cycle in consequence of the difference in pressure that obtains between the injector inlet and outlet, and closes after a predetermined quantity of brine has been educted from the brine tank. Thereafter, only source water will flow through the injector while the valve element 18 remains in its regenerating position, to cause upflow rinsing of brine from the softener tank and the ion exchange resin therein. Rinsing continues, of course, for a predetermined and timed interval, after which the valve element is automatically returned to its service position.

The pilot valve 44 which controls operation of the fluid motor 30 comprises a spindle or valve stem 56 which is journaled in a bore 57 in a small valve housing 58 for rotation on an axis parallel to that of the valve element 18. The housing is secured to the exterior of the valve body, at its side remote from the drain outlet 146, by the screws 45 mentioned previously.

The upper end of the valve stem projects from the top of the housing and has a bevel gear 59 secured thereto for meshing engagement with a mating bevel gear, not shown, on the drive shaft of a small electric motor 60 which is mounted on the housing of the pilot valve as shown in FIGURE 1. A U-shaped strap 61 embracing the motor and pilot housing, and secured to pads 62 on the exterior of the valve body 11 by screws 63 holds the motor in place on the pilot housing.

The electric motor, of course, is adapted to be controlled by an electrical timing device (not shown) of a more or less conventional type which includes switch instrumentalities that limit rotation of the valve member 56 to only one-half a revolution each time the motor is energized.

The spindle 56 of the pilot valve is smaller in diameter than the bore 57 in which it operates, so as to define an annular valve chamber 64 which is closed at its ends by seal members 65 mounted on collars on the opposite end portions of the spindle. Medially of its ends, the spindle is encircled by a land which is grooved to receive an O ring seal 66 that engages the wall of the bore 57 but which is disposed at an oblique angle with respect to the spindle axis, and controls communication between a number of pilot passages that open to the valve chamber 64.

One of these pilot passages 68 is formed in the lower end portion of the valve housing, opens inwardly to the valve chamber 64 through a pressure port 168 and outwardly to the adjacent side of the body 11 of the main valve, where it communicates with a passage 268 in the body of the main valve leading to its source water inlet chamber 48. Consequently, source water under pressure will be maintained at all times in that portion of the pilot valve chamber 64 which is beneath the O ring seal 66.

A second pilot passage 69 is formed in the upper end portion of the valve housing, opens inwardly to the valve chamber 64 through a drain port 169 and outwardly to the adjacent side of the body 11 of the main valve, where it communicates with a passage 269 in the main valve body leading to its drain chamber 46. Hence, that portion of the valve chamber 64 which is above the O ring 66 will at all times be vented to the drain outlet of the main valve.

A third pilot passage 70 is formed in the medial portion of the pilot housing, opens inwardly to one side of the valve chamber 64 through a first service port 170 and outwardly to the adjacent side of the main valve body 11, where it communicates with a passage 270 in the main valve body, that has a branch extending upwardly therein and opening to the lower diaphragm chamber 40 through the motor port 42. In the service position of the pilot valve seen in FIGURES 4 and 5, the land seal 66 on the valve spindle is disposed such as to establish communication between the pilot pressure and first service ports 168 and 170, respectively, so that source water under pressure can flow into the lower diaphragm chamber 40 and hold the diaphragm in its upwardly flexed position at which it maintains the valve element 18 of the main valve in its service position.

The valve housing 58 contains a fourth pilot passage in its medial portion, identical to the passage 70 but opening inwardly to the valve chamber 64 through a second service port 171 at the side of the valve chamber opposite the first service port 170. This fourth pilot passage opens outwardly to the adjacent side of the main valve body, where it communicates with a passage 271 in the main valve body that has a branch extending upwardly therein and communicating with the motor port 41 for the upper diaphragm chamber 39. As seen best in FIGURE 6, the passage 271 opens to the face of the flange on the upper end of the main valve body, in register with a hole 72 in the peripheral portion of the diaphragm, to thus communicate with a passage 73 in the cover 32. The passage 73 communicates with the motor port 41 for the upper diaphragm chamber 39 and provides an extension of the passage 271 in the main valve body.

Since the second service port 171 lies at the side of the land seal 66 opposite the first service port 170 in the service position of the pilot valve seen in FIGURES 4 and 5, it communicates the upper diaphragm chamber 39 with the pilot drain port 169 to thus vent the upper diaphragm chamber and permit water therein to be exhausted to the drain outlet 146 of the main valve whenever the diaphragm 35 is forced upwardly to its service position by the admittance of source water under pressure into the lower diaphragm chamber.

At the conclusion of a timed service cycle of a water softening system equipped with the control valve of this invention, the motor 60 is energized to drive the spindle 56 of the pilot valve through one-half a revolution from its service position to its regenerating position, not shown, to dispose the land seal 66 at an angle opposite that seen in FIGURE 4. In its regenerating position, the land seal 66 will communicate the first service port 170 of the pilot with the pilot drain port 169 to thus vent the lower diaphragm chamber to the drain outlet 146 of the main valve, and will establish communication between the second service port 171 of the pilot with the pilot pressure port 168 so that source water under pressure can flow into the upper diaphragm chamber and flex the diaphragm downwardly, thus shifting the valve element 18 to its regenerating position seen in FIGURE 3.

At the conclusion of a timed regenerating cycle which is long enough to assure adequate rinsing following injection of a predetermined quantity of brine into the softener tank, the motor 60 is again energized to drive the spindle 56 of the pilot valve another one-half of a revolution and thus return it to its service position at which the fluid motor 30 acts to shift the main valve element 18 upwardly to its service position.

The pilot valve 44 is a unit that can be mounted directly on the body of the main valve, as shown and described, or it can be located apart from the main valve on some other portion of a water softener system, in which case its ports 168–169–170 and 171 can be readily connected by tubing with the passages 268–269–270 and 271, respectively, in the main valve body.

In either case, it is of the essence of this invention to observe that the pilot controlled passages will always be connected with the drain and source water inlet chambers 46 and 48, respectively, of the main valve, in parallel circuit relationship with respect to the system flow circuits through the main valve. This is especially important during regeneration, when the regenerating flow circuit leads through the tank passage 147, and during which the brine and rinse effluents are led directly to the drain outlet 148 in bypass relation to the pilot valve. Accordingly, none of the brine and/or rinse effluent flowing to the drain outlet from the first tank passage 147 ever flows through the pilot valve, and it can never become fouled by the dirt and other solid foreign particles issuing from the softener tank during regeneration.

From the foregoing description, together with the accompanying drawings, it will be apparent that this invention provides a control valve for water softeners which features an improved arrangement of ports and passages as well as pilot valve mechanism that is notably free of fouling and malfunctioning, and which thus overcomes one of the main objections to valves of this type heretofore available.

What is claimed as my invention is:

A control valve for governing service and regenerating flow of fluids in a water softening system, comprising:
(A) an elongated valve body having a bore extending lengthwise therein;
(B) a drain passage in the body communicating with the bore at a location near one end of the body and opening to a drain port at its exterior;
(C) other passages in the body respectively opening to ports at the exterior thereof and communicating with the bore at locations spaced farther from said one end of the body, said other passages providing (1) a source water inlet passage having a portion adjacent to the drain passage,
(2) a service passage,
(3) first and second tank passages,
(4) and a brine inlet passage;

(D) a valve element slidable in the bore between service and regenerating positions to control communication between said passages and thus effect service and regenerating operation of a water softening system governed by the valve;

(E) means on said one end of the body defining a hydraulic motor comprising
(1) a housing which is coaxial with the bore,
(2) and a fluid pressure responsive actuator operatively connected with the valve element and dividing the housing into a pair of pressure chambers, said actuator being movable in opposite axial directions to effect shifting of the valve element between its service and regenerating positions, in response to pressurization of each chamber, in turn, at times when the other chamber is vented;

(F) means in the body defining a pair of passageways, one for each chamber and communicating therewith, said passageways extending lengthwise of the body past a portion of the drain passage;

(G) and a pilot valve on the exterior of the valve body, in spaced relation to said one end thereof and to said motor, said pilot valve having
(1) an inlet port opposite a portion of the source water inlet passage and communicating therewith,
(2) an outlet port opposite a portion of the drain passage and communicating therewith,
(3) a pair of service ports, one for each of said chamber connected passageways and communicating therewith,
(4) and a valve member movable from service to regenerating positions to in turn communicate each of its service ports with its inlet port and to communicate the other of its service ports with its outlet port.

References Cited by the Examiner
UNITED STATES PATENTS

| | | | |
|---|---|---|---|
| 610,479 | 9/1898 | Ewart | 251—31 |
| 2,845,092 | 7/1958 | Vomacka | 251—31 X |
| 3,055,394 | 9/1962 | Dilliner | 137—625.29 |
| 3,183,933 | 5/1965 | Whitlock et al. | 137—625.29 X |
| 3,208,476 | 9/1965 | Clack | 137—599.1 |

M. CARY NELSON, *Primary Examiner.*
ARNOLD ROSENTHAL, *Examiner.*